United States Patent
Creely, III et al.

[11] Patent Number: 6,033,168
[45] Date of Patent: Mar. 7, 2000

[54] JACKING SCREW

[76] Inventors: Albert L. Creely, III, 797 Century La., Glen Mills, Delaware County, Pa. 19342; Mark Dobson, 2 Copples La., Wallingford, Delaware County, Pa. 19086

[21] Appl. No.: 09/167,421

[22] Filed: Oct. 6, 1998

[51] Int. Cl.[7] .................................................. F16B 39/00
[52] U.S. Cl. ........................... 411/107; 411/353; 411/999
[58] Field of Search .................................. 411/352, 353, 411/107, 396, 408, 409, 970, 999

[56] References Cited

U.S. PATENT DOCUMENTS

| | | |
|---|---|---|
| 2,376,089 | 5/1945 | Savageau . |
| 3,062,253 | 11/1962 | Millheiser . |
| 3,245,450 | 4/1966 | Sauter ..................................... 411/999 |
| 3,502,130 | 3/1970 | Gulistan . |
| 3,639,971 | 2/1972 | Gulistan . |
| 3,746,067 | 7/1973 | Gulistan . |
| 4,174,008 | 11/1979 | Preziosi et al. . |
| 4,212,224 | 7/1980 | Bragg, Jr. et al. . |
| 4,878,795 | 11/1989 | Woodrow et al. . |
| 4,930,959 | 6/1990 | Jagelid . |
| 4,952,107 | 8/1990 | Dupree . |
| 5,642,972 | 7/1997 | Ellis ........................................ 411/352 |
| 5,785,449 | 7/1998 | DiBene . |
| 5,941,669 | 8/1999 | Aukzemas ............................... 411/353 |

OTHER PUBLICATIONS

Southco, Inc., Southco Captive Screw Assembly, 1992.
Fastener Technology Corp., Jack Screw, 1987.
Amsco, Hex Jack Screw, part No. 67664.
RAF Electronic Hardware Brochure, Seymour, CT 06483, 3/16 Hex Jack Screws.

Southco, Inc., drawing sheet No. 52–N–120, Jan. 24, 1992.

Southco, Inc., drawing sheet No. F5–N–128, Jul. 7, 1993 Rev.C.

Southco, Inc., drawing sheet No. 47–N–378, Sep. 12, 1991 Rev. B.

Southco, Inc. Southco Handbook—North American Edition—48 NA, pp. C1–C55, 1998.

*Primary Examiner*—Flemming Saether

[57] ABSTRACT

A jacking screw for attaching a first panel to a second panel which provides a force in the axial direction of the screw when the screw rotates in a first direction to jack the first panel down to the second panel and which provides a force in the axial direction of the screw with respect to the panel when the screw is rotated in the opposite direction to pry the first panel away from the second panel. The jacking screw has a screw, a ferrule surrounding and coaxial to the screw shaft, and a knob. The first end of the ferrule is attachable to a panel and the second end has an outwardly protruding annular step. The knob is attached to the head of the screw and Ahas a downwardly extending generally cylindrical portion, coaxial to the screw shaft and the ferrule and the downwardly extending cylindrical portion secures the knob to the ferrule allowing for rotational movement of the knob with respect to the ferrule but allowing substantially no axial movement of the knob with respect to the ferrule.

6 Claims, 10 Drawing Sheets

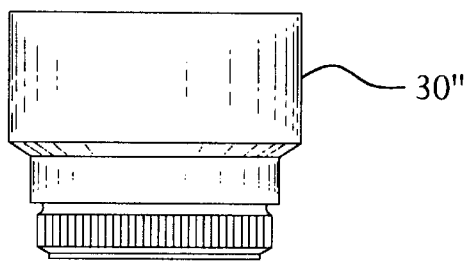
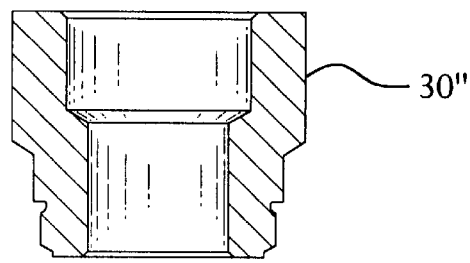
FIG. 4  FIG. 5
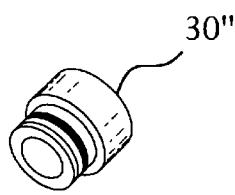
FIG. 3

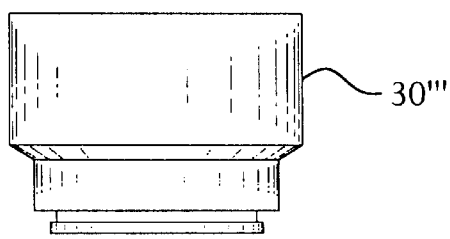
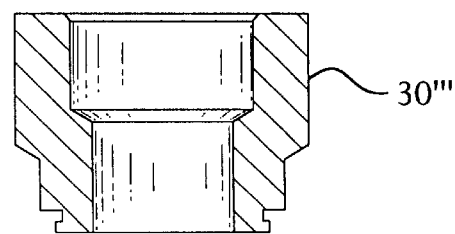
FIG. 7   FIG. 8
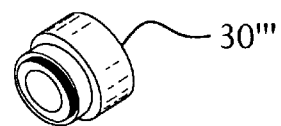
FIG. 6

JACKING SCREW

BACKGROUND OF THE INVENTION

This invention relates to fasteners in general. More particularly, this invention relates to fasteners of the type used to secure panels or modules to a receiving frame or housing that requires the panel or module to be jacked out by a screw known as a "jack-out screw." Many applications exist for this type of jacking screw. For example, it may be advantageous to use jacking screws on a printed circuit board assembly that is mounted within a housing. If that printed circuit board assembly is plugged into a connector where there is a substantial amount of force required to extract the board from the connectors, the use of one or more jack-out screws may be desirable.

Some prior art jacking screws use a retainer ring on the screw shaft to captivate the screw in the housing which is mounted on a first panel. This retainer ring may separate and cause the jacking screw to uncouple or otherwise come apart during the jacking operation.

SUMMARY OF THE INVENTION

The present invention provides a captive jacking screw for attaching a first panel to a second panel. The captive jacking screw further enables the two panels to be compelled together or apart as the captive jacking screw is rotated. The captive jacking screw mounts on the first panel and is screwed into a threaded hole in the second panel.

The jacking screw for attaching a first panel to a second panel provides a force in the axial direction of the screw when the screw rotates in a first direction to jack the first panel down to the second panel and also provides a force in the axial direction of the screw with respect to the panel when the screw is rotated in the opposite direction to pry the first panel away from the second panel. The jacking screw includes a screw having a threaded shaft and a head, a ferrule surrounding and coaxial to the screw shaft having a first end and a second end. The first end of the ferrule has a panel attachment means for anchoring the ferrule to the first panel, and the second end has an outwardly protruding annular step. Finally, a knob is attached to the head of the screw and has a downwardly extending generally cylindrical portion, coaxial to the screw shaft and the ferrule and surrounds a portion of the ferrule adjacent the second end of the ferrule. The downwardly extending cylindrical portion has means to secure the knob to the ferrule allowing for rotational movement of the knob with respect to the ferrule but allowing substantially no axial movement of the knob with respect to the ferrule.

It is therefore an object of the present invention to provide a jacking screw that does not use a retainer ring which may cause the jacking screw to come apart during the jacking operation.

It is another object of the present invention to provide a jacking screw that retains the screw in its housing at a location remote from the threads of the screw.

It is a still further of the present invention to provide a jacking screw that allows for substantially no axial movement of the screw with respect to the ferrule.

Other objects and advantages of the present invention will become apparent from the following description taken in conjunction with the accompanying drawings.

BRIEF DESCRIPTION OF THE DRAWINGS

FIG. 3 is a perspective view of a printed circuit board press-in style ferrule for use in the jacking screw of either of FIG. 1 or FIG. 2.

FIG. 4 is a front elevation view of the printed circuit board press-in style ferrule of FIG. 3.

FIG. 5 is a cross sectional, front elevation view of the printed circuit board press-in style ferrule of FIG. 3.

FIG. 6 is a perspective view of a press-in style ferrule for use in the jacking screw of either of FIG. 1 or FIG. 2.

FIG. 7 is a front elevation view of the press-in style ferrule of FIG. 6.

FIG. 8 is a cross sectional, front elevation view of a press-in style ferrule of FIG. 6.

DESCRIPTION OF THE PREFERRED EMBODIMENTS

Figure 1:
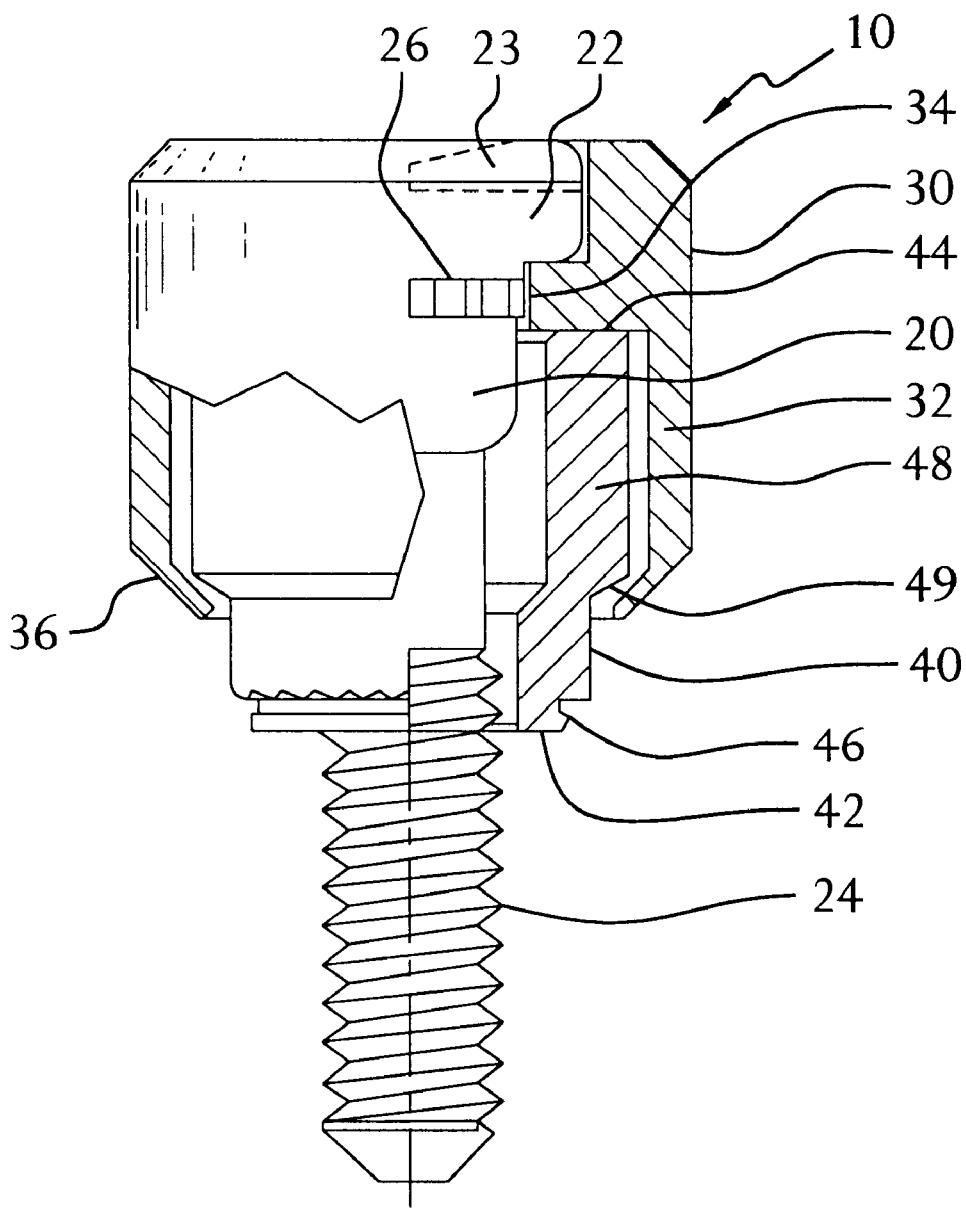
FIG. 1 is a front elevation view of a jacking screw in accordance with one embodiment of the present invention.

Referring now in detail to the drawings, wherein like reference numerals indicate like elements throughout the several views, there is shown in FIG. 1 a captive jacking screw 10 in accordance with one preferred embodiment of the present invention. The illustrative captive jacking screw 10 is shown generally comprising a screw 20 having a head 22 and a threaded shaft 24, a knob 30 that is preferably, but optionally, integral to the head of the screw 20, and a ferrule 40 that is mountable to a first panel (not shown) in a standard manner. The ferrule has a first end 42 and a second end 44. The first end of the ferrule has a panel attachment means 46 as will be discussed in greater detail below. The second end of the ferrule 40, in combination with the knob 30, has a means to retain the knob 30 (and therefore the preferably integral screw 20) to the ferrule 40, that allows for rotational movement of the knob 30 and screw 20 with respect to the ferrule 40, but allows for substantially no longitudinal movement of the knob 30 and screw 20 with respect to the ferrule 40.

The screw 20 is preferably rigidly attached to the knob 30 by means as known in the art, for example, an interference fit between a knurled section 26 of the screw 20 and an internal annular flange 34 on the knob 30.

The means to retain the knob to the ferrule of the preferred embodiment as shown in FIG. 1 includes a ferrule 40 having an outwardly protruding annular step 48 adjacent the second end 44 of the ferrule 40. The height of this annular step 48, that is, the height from the second end 44 of the ferrule 40 to the point that the outer diameter of the ferrule is reduced 49, generally corresponds to the length of a downwardly extending cylindrical portion 32 of the knob 30 which extends below an internal annular flange 34 on the knob 30. The end 36 of the downwardly extending cylindrical portion 32 of the knob 30 is then rolled over to capture the annular step 48 such that substantially no longitudinal movement of the knob 30 with respect to the ferrule 40 is available. Thus, the ferrule 40 is attached to a panel and the knob 30 and the screw 20 is captured on the ferrule such that substantially no longitudinal movement of the knob 30 and screw 20 is allowed, but rotational movement of the knob 30 and screw 20 with respect to the ferrule 40 is allowed.

Therefore, when the captive screw 10 is mounted on a first panel and when the knob 30 or screwdriver recess 23 of the screw 20 is rotated clockwise into a threaded hole in a second panel, the first panel is lowered by a jacking motion down onto the second panel. When the knob 30 or screwdriver recess 23 of the screw 20 is rotated in a counterclockwise direction, the first panel is raised away from the second panel by a jacking motion.

Figure 2:
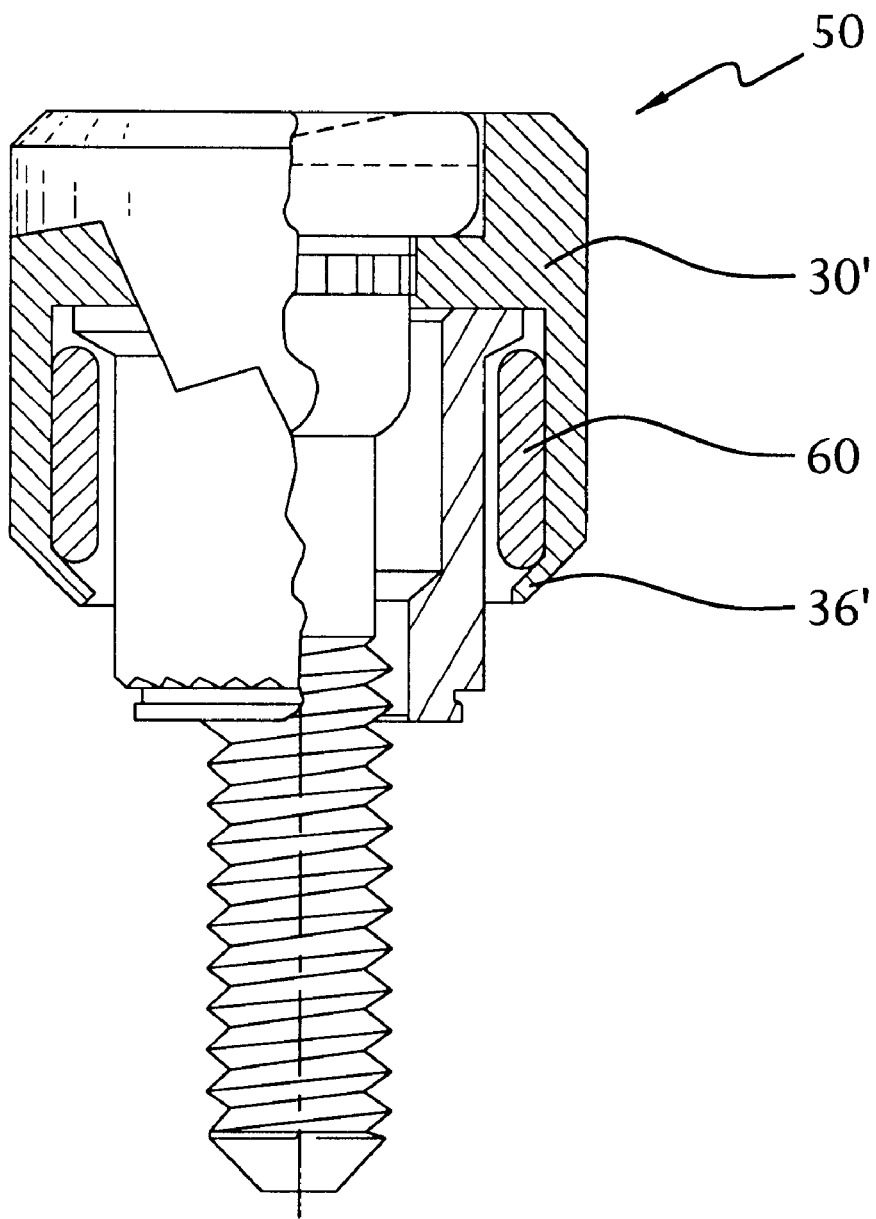
FIG. 2 is a front elevation view of a jacking screw in accordance with a second embodiment of the present invention.
Figure 10:
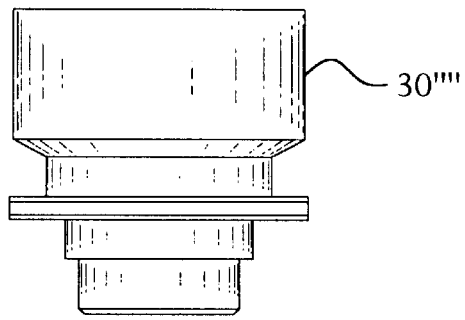
FIG. 10 is a front elevation view of the floating style ferrule of FIG. 9.
Figure 11:
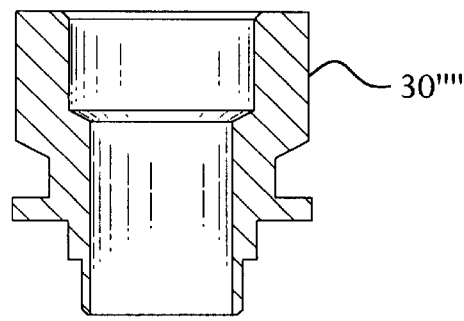
FIG. 11 is a cross sectional, front elevation view of a floating style ferrule of FIG. 9.
Figure 9:
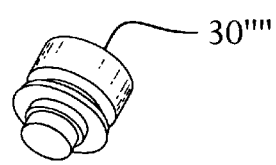
FIG. 9 is a perspective view of a floating style ferrule for use in the jacking screw of either of FIG. 1 or FIG. 2.
Figure 13:
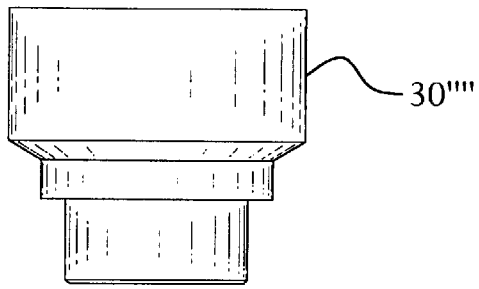
FIG. 13 is a front elevation view of the flare-in style ferrule of FIG. 12.
Figure 14:
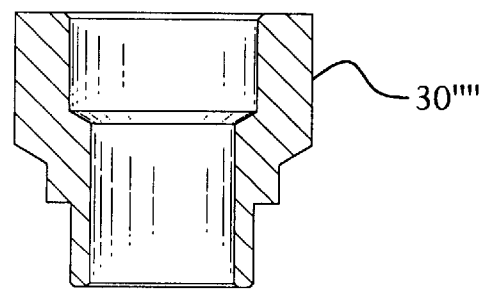
FIG. 14 is a cross sectional, front elevation view of a flare-in style ferrule of FIG. 9.
Figure 12:
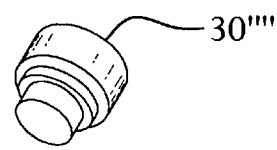
FIG. 12 is a perspective view of a flare-in style ferrule for use in the jacking screw of either of FIG. 1 or FIG. 2.

FIG. 2 depicts a jacking screw 50 which is a first alternate embodiment of the jacking screw 10 of FIG. 1. Here, a metal or plastic shim 60 takes up the space between the rolled over section 36' of the knob 30', thereby allowing for one ferrule design to accommodate differing knob lengths and perhaps to provide the ability to change shim 60 lengths to allow for some vertical movement of the screw/knob with respect to the ferrule. Other elements of this embodiment are substantially the same as those of the embodiment of FIG. 1.

FIGS. 3–14 show various views of various ferrules having different panel attachment means 46, including printed circuit board press-in 30" (FIGS. 3–5), standard press-in 30''' (FIGS. 6–8), floating 30'''' (FIGS. 9–11), and flare-in 30''''' (FIGS. 12–14) as are known in the art, which may be used on any embodiment indicated herein. Others as are known in the art, e.g. "snap-in," may also be used.

Figure 15:
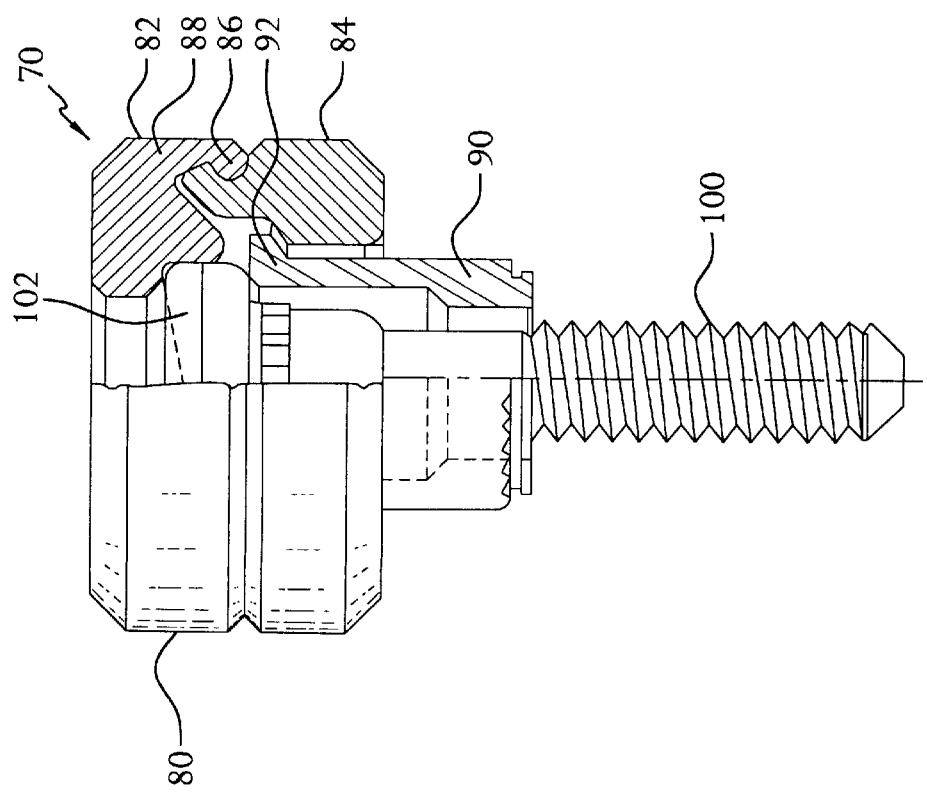
FIG. 15 is a front elevation, partially cut away view of a jacking screw in accordance with a third embodiment of the present invention.

FIG. 15 depicts a second alternate embodiment jacking screw 70 in accordance with the present invention. Here, a two-piece knob 80, having an upper member 82 and a lower member 84, secures the protruding annular step 92 of the ferrule 90. The screw head 102 of the screw 100 and the protruding annular step 92 of the ferrule 90 are captured between the upper member 82 and the lower member 84 of the knob 80. The upper member 82 and the lower member 84 are secured to one another by yieldable upper and lower annular elements 86, 88, as are clearly seen in FIG. 15.

Figure 16:
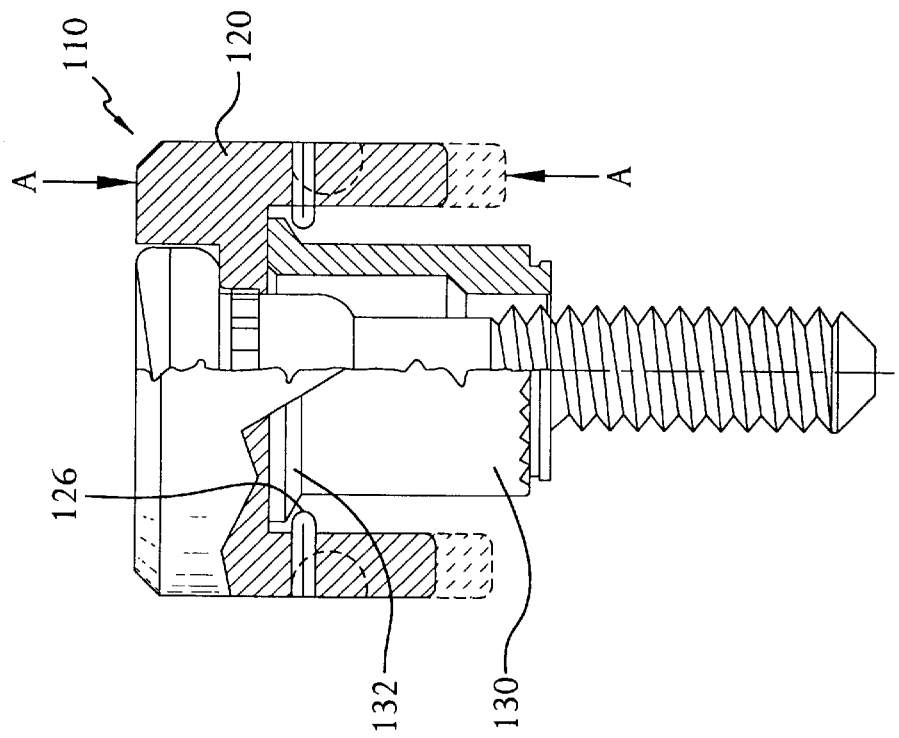
FIG. 16 is a front elevation, partially cut away view of a jacking screw in accordance with a fourth embodiment of the present invention.
Figure 17:
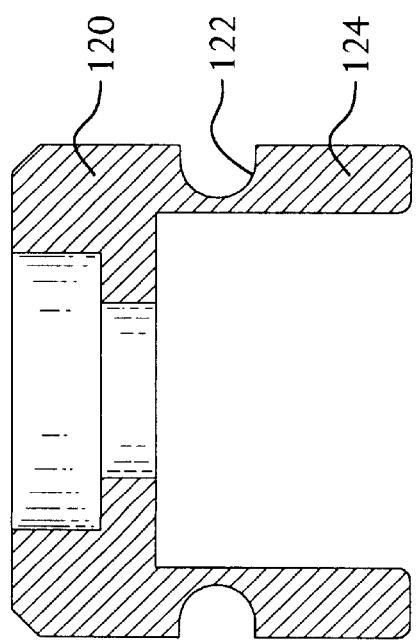
FIG. 17 is a cross-sectional, front elevational view of a knob for the jacking screw of FIG. 16.

FIG. 16 depicts a third alternate embodiment of a jacking screw 110 in accordance with the present invention. Here, a single piece knob 120 (see FIG. 17 for view prior to assembly), has an annular groove 122 encircling the outer perimeter of the downwardly extending cylindrical portion 124 of the knob 120. To captivate the knob 120 on the ferrule 130, pressure is applied to knob 120 in directions A (as seen in FIG. 16) such that the annular groove 122 (see FIG. 17) collapses and creates a bulge 126 (see FIG. 16) which protrudes radially inwardly, adjacent the protruding annular step 132 of the ferrule 130 to captivate the knob on the ferrule.

Figure 18:
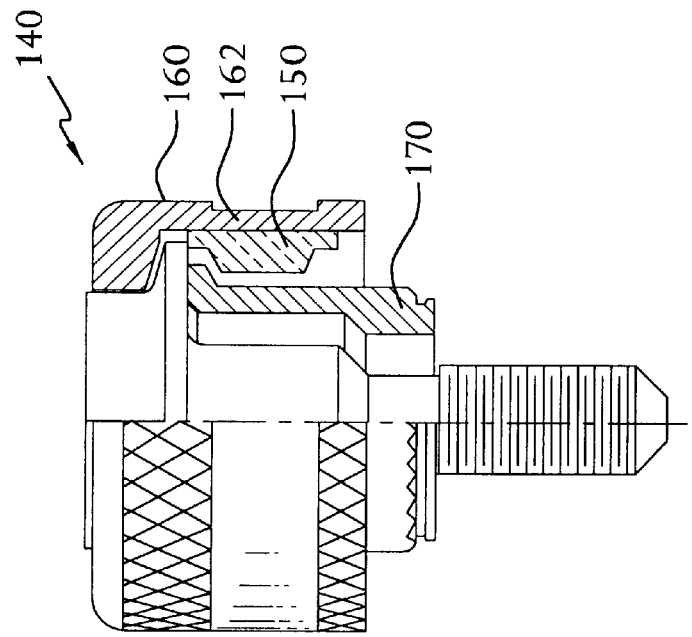
FIG. 18 is a front elevation, partially cut away view of a jacking screw in accordance with a fourth embodiment of the present invention.

FIG. 18 depicts a fourth alternate embodiment of a jacking screw 140 in accordance with the present invention. Here, an annular ring 150, for example a split ring or a solid ring, having a slight interference fit is inserted into the knob 160 adjacent the downwardly extending cylindrical portion 162 of the knob 160 to capture the knob 160 with respect to the ferrule 170.

Figure 19:
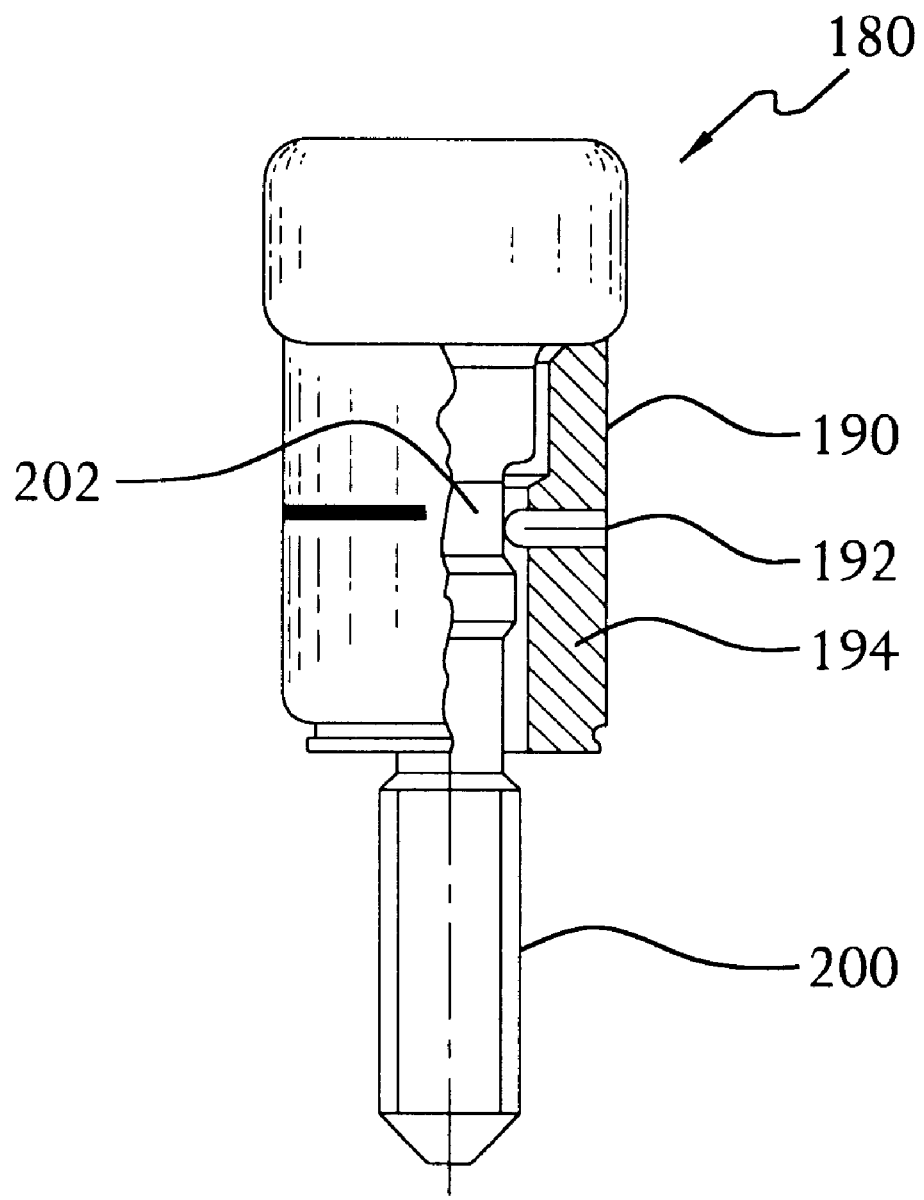
FIG. 19 is a front elevation, partially cut away view of a jacking screw in accordance with a fifth embodiment of the present invention.
Figure 20:
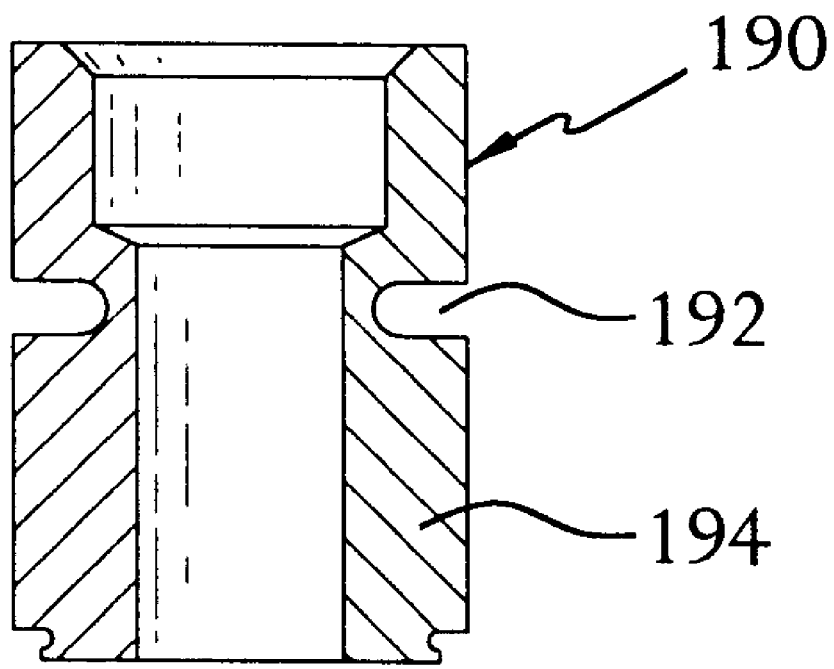
FIG. 20 is a front elevation, cut away view of a ferrule for the jacking screw of FIG. 19.

Finally FIG. 19 depicts a fifth alternate embodiment of a jacking screw 180 in accordance with the present invention. This embodiment uses the crimping action of the third alternate embodiment, but here, the screw 210 is inserted into the ferrule 190 and pressure is applied axially to the ferrule 190 to collapse a portion 192 of the ferrule wall 194 (see FIG. 20) such that the collapsed portion 192 engages an annular groove 202 in the shaft 204 of the screw 200 to captivate the screw 200 with respect to the ferrule 190. Again, any known panel attachment means may be used.

As discussed above, when the phrase "substantially no axial movement" is mentioned, some limited amount of axial movement is of course necessary to allow for smooth rotation of the knob with respect to the ferrule in all of the above embodiments. It is intended that some moderate amount of axial movement is acceptable due to manufacturing tolerances and the like, but it is desired that only a small amount of movement is made possible. Such movement is anticipated to fall within the present definition of substantially no axial movement.

Of course, any type of screw driver recess would likely work adequately for the present jack-out screw, including Phillips, six-lobed, slotted, and the like.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. A jacking screw for attaching a first panel to a second panel which provides a force in the axial direction of the screw when the screw rotates in a first direction to jack the first panel down to the second panel and which provides a force in the axial direction of the screw with respect to the panel when the screw is rotated in the opposite direction to pry the first panel away from the second panel, said jacking screw comprising:

(a) a screw having a threaded shaft and a head;

(b) a ferrule surrounding and coaxial to said screw shaft having a first end and a second end, said first end having a panel attachment means for anchoring said ferrule to the first panel, said second end having an outwardly protruding annular step; and (c) a knob attached to the head of the screw, having a downwardly extending generally cylindrical portion, coaxial to said screw shaft and said ferrule and surrounding a portion adjacent the second end of the ferrule, said downwardly extending cylindrical portion having means to secure the knob to the ferrule allowing for rotational movement of the knob with respect to the ferrule but allowing substantially no axial movement of the knob with respect to the ferrule.

2. The jacking screw of claim 1, wherein the means to secure the knob and screw to the ferrule includes a rolled over portion of the downwardly extending cylindrical portion of the knob mating with the outwardly protruding annular step at the second end of the ferrule whereby the rolled over portion of the knob captures the annular step of the ferrule to axially secure the knob to the ferrule.

3. The jacking screw of claim 2, including a generally cylindrical shim surrounding the ferrule adjacent the downwardly extending cylindrical portion of the knob to reduce allowable vertical movement of the knob with respect to the ferrule.

4. The jacking screw of claim 1, wherein the means to secure the knob to the ferrule includes a yieldable portion of the downwardly extending cylindrical portion of the knob that, upon an axial force to the knob, folds radially inwardly toward the ferrule to capture the knob on the outwardly protruding annular step on the second end of the ferrule to axially secure the knob to the ferrule.

5. The jacking screw of claim 1, wherein the means to secure the knob to the ferrule includes the knob having an upper and a lower member, said screw head integrally attached to the upper member of the knob, said lower member of the knob attached to the upper member of the knob and capturing the protruding annular step of the ferrule therebetween to axially secure the knob to the ferrule.

6. The jacking screw of claim 1, wherein the means to secure the knob to the ferrule includes a separate internal knob ring that rigidly attaches to an inner surface of the downwardly extending cylindrical portion of the knob that captures the protruding annular step of the ferrule within the knob to axially secure the knob to the ferrule.

* * * * *

UNITED STATES PATENT AND TRADEMARK OFFICE
CERTIFICATE OF CORRECTION

PATENT NO. : 6,033,168
DATED : March 7, 2000
INVENTOR(S) : Albert Creely, III, et al.

It is certified that error appears in the above-identified patent and that said Letters Patent are hereby corrected as shown below:

Cover Sheet, left hand column, after the recitation of the inventors, please add --Assignee: Southco, Inc., Concordville, PA--

Signed and Sealed this

Eighth Day of May, 2001

*Attest:*

NICHOLAS P. GODICI

*Attesting Officer*  Acting Director of the United States Patent and Trademark Office